United States Patent [19]

Willis et al.

[11] Patent Number: 4,970,254

[45] Date of Patent: Nov. 13, 1990

[54] METHOD FOR HYDROGENATING FUNCTIONALIZED POLYMER AND PRODUCTS THEREOF

[75] Inventors: Carl L. Willis; Lorelle A. Pottick, both of Houston; Dan E. Goodwin, Katy, all of Tex.

[73] Assignee: Shell Oil Company, Houston, Tex.

[21] Appl. No.: 247,835

[22] Filed: Sep. 22, 1988

[51] Int. Cl.$^5$ .................... C08F 293/00; C08C 19/02
[52] U.S. Cl. ................... 525/314; 525/332.9; 525/338; 525/333.2
[58] Field of Search ............ 525/314, 332.9, 338, 525/333.2

[56] References Cited

U.S. PATENT DOCUMENTS

| | | | |
|---|---|---|---|
| Re. 27,145 | 6/1971 | Jones | 260/880 |
| 3,113,986 | 12/1963 | Breslow et al. | 260/683.9 |
| 3,135,716 | 6/1964 | Uraneck et al. | 260/45.5 |
| 3,150,209 | 9/1964 | Short et al. | 260/894 |
| 3,231,635 | 1/1966 | Holden et al. | 260/880 |
| 3,265,765 | 8/1966 | Holden et al. | 260/876 |
| 3,322,856 | 5/9167 | Holden et al. | 260/876 |
| 3,494,942 | 2/1970 | Miki et al. | 260/397.5 |
| 3,496,154 | 2/1970 | Wofford | 260/84.7 |
| 3,498,960 | 3/1970 | Wofford | 260/84.7 |
| 3,595,942 | 7/1971 | Wald et al. | 260/880 |
| 3,634,549 | 1/1972 | Shaw et al. | 260/880 B |
| 3,670,054 | 6/1972 | De La Mare et al. | 260/880 B |
| 3,700,633 | 10/1972 | Wald et al. | 260/880 B |
| 3,700,637 | 10/1972 | Finch | 260/83.3 |
| 3,766,300 | 10/1973 | De La Mare | 525/338 |
| 3,793,274 | 0/1974 | Hiyama et al. | 260/23 XA |
| 3,976,628 | 8/1976 | Halasa et al. | 526/22 |
| 4,010,130 | 3/1977 | Matsuo | 260/28.5 |
| 4,033,888 | 7/1977 | Kiovsky | 252/56 D |
| 4,077,893 | 3/1978 | Kiovsky | 252/56 R |
| 4,129,557 | 12/1978 | Kudo et al. | 526/283 |
| 4,141,847 | 2/1979 | Kiovsky | 252/51.5 A |
| 4,145,298 | 3/1979 | Trepka | 252/51.5 A |
| 4,229,308 | 10/1980 | Brulet et al. | 525/332.9 |
| 4,238,202 | 12/1980 | Trepka et al. | 44/62 |
| 4,292,414 | 9/1981 | Saito et al. | 525/255 |
| 4,308,353 | 12/1981 | Saito et al. | 525/74 |
| 4,328,202 | 5/1982 | Gries et al. | 424/5 |
| 4,329,438 | 5/1982 | Yamori et al. | 525/64 |
| 4,391,949 | 8/1984 | St. Clair | 525/99 |
| 4,427,828 | 1/1984 | Hergenrother et al. | 525/66 |
| 4,444,953 | 8/1984 | St. Clair | 525/98 |
| 4,460,724 | 7/1984 | Tsuchiya et al. | 524/77 |
| 4,578,429 | 3/1985 | Gergen et al. | 525/291 |
| 4,628,072 | 12/1986 | Shiraki et al. | 525/57 |
| 4,631,315 | 12/1986 | Buding et al. | 525/338 |
| 4,647,627 | 3/1987 | Buding et al. | 525/234 |

FOREIGN PATENT DOCUMENTS

| | | | |
|---|---|---|---|
| 2139514 | 2/1973 | Fed. Rep. of Germany | 525/314 |
| 1558491 | 1/1980 | United Kingdom . | |

*Primary Examiner*—John C. Bleutge
*Assistant Examiner*—Vasu S. Jagannathan

[57] ABSTRACT

A method for preparing hydrogenated polymers containing acidic functionality in a portion thereof initially containing ethylenic unsaturation from a polymer containing ethylenic unsaturation or both aromatic and ethylenic unsaturation comprising the steps of first incorporating an acidic functional group precursor radical into the polymer, hydrogenating at least a portion of the ethylenic unsaturation contained in the polymer containing the acidic functional group precursor radicals and then converting at least a portion of the acidic functional group precursor radicals to the corresponding acidic functional group. In general, any acidic functional group precursor radical which will have less of an impact upon the hydrogenation reaction than the corresponding acidic functional group may be used. Best results are, however, achieved when acidic functional group precursors are used which are relatively neutral and which do not react, or complex with the metal compounds used to prepare the catalyst or resulting from the combination of such metal compounds. The catalyst used to effect the hydrogenation will be prepared by combining a compound, preferably an alkoxide or carboxylate, of an iron group metal with an alkyl or a hydride containing a Group I-A, II-A or III-B metal. Preparation of the catalyst is preferably accomplished in the presence of water. Best results are achieved when the acidic functional group precursor is a metal salt and the metal salt and the reducing component used to prepare the catalyst contain the same metal. Depending upon the particular catalyst employed and the acidic functional group precursor radical used, up to about 90-95% of the ethylenic unsaturation initially contained in the polymer can be converted or hydrogenated.

33 Claims, No Drawings

METHOD FOR HYDROGENATING FUNCTIONALIZED POLYMER AND PRODUCTS THEREOF

BACKGROUND

1. Field of the Invention

This invention relates to a method for preparing hydrogenated and functionalized polymers and to the hydrogenated products thus obtained. More particularly, this invention relates to a method for preparing hydrogenated polymers which contain acidic functional groups which normally interfere with hydrogenation and to the hydrogenated products containing such functional groups.

2. Prior Art

Polymers containing ethylenic unsaturation and both aromatic and ethylenic unsaturation are, of course, well known in the prior art. Frequently, polymers of this type are prepared by polymerizing one or more polyolefins, particularly diolefins, either alone or in combination with one or more alkenyl aromatic hydrocarbons. Polymers of this type are taught, for example, in U.S. Pat. Nos. 3,135,716; 3,150,209; 3,321,635; 3,265,765; 3,322,856; 3,496,154; 3,498,960; 4,145,298 and 4,328,202. As is well known, copolymers containing both aromatic and ethylenic unsaturation may range from plastic to elastic depending, inter alia, upon the relative amount of polyolefin and alkenyl aromatic hydrocarbon monomer units contained therein.

The use of polymers containing ethylenic unsaturation and both aromatic and ethylenic unsaturation, particularly elastomeric polymers, as a modifier in polymeric compositions containing thermosetting polyesters as well as in polymeric compositions containing various engineering thermoplastics is also well known in the prior art. Compositions of this type containing thermosetting polyesters are taught, for example, in the Background section of U.S. Pat. Nos. 4,329,438. Compositions of this type containing various engineering thermoplastics are taught, for example, in the Background section of U.S. Pat. No. 4,628,072. In general, polymers initially containing ethylenic or ethylenic and aromatic unsaturation may be either a major or minor component in the polymeric composition. As is also well known, however, when the unsaturated polymer is simply admixed with a thermosetting or thermoplastic polymer in a molding composition, destructive phase separation frequently occurs as does rubber bleeding to the surface during curing or setting. Moreover, when the unsaturated polymer is used directly, o neat, shaped products prepared from the compositions generally exhibit poor weatherability and poor thermal stability.

Recently, it has been discovered that destructive phase separation (incompatibility) and the problems associated therewith can be eliminated or at least significantly reduced if the polymer containing ethylenic unsaturation or both aromatic and ethylenic unsaturation is functionalized prior to its incorporation into a composition containing a thermosetting or thermoplastic polymer. Such functionalization is taught, for example, in U.S. Pat. Nos. 4,329,438; 4,578,429 and 4,628,072. In general, functionalization is accomplished by incorporating one or more functional groups, particularly carboxylic acid groups or a derivative thereof into the polymer. In general, functionalization with a carboxylic acid group, particularly a polycarboxylic acid, is considered to be most advantageous.

As is well known, polymers containing ethylenic unsaturation may be functionalized thermally through the so-called ENE reaction wherein an ethylenically unsaturated functionalizing agent, particularly a dicarboxylic acid, is grafted onto the polymer at a carbon atom which is allylic to an ethylenic unsaturation contained therein. Functionalization may also be accomplished via free-radical grafting of an ethylenically unsaturated carboxylic acid onto the polymer, said ethylenically unsaturated functionalizing agent adding across a double bond contained in the polymer. The free-radicals required for such grafting may be imparted either thermally or with a free-radical initiator. Of these methods, incorporation of a functional group via the so-called ENE reaction is frequently preferred since it tends to result in the incorporation of a single functional group at each point of incorporation whereas the methods involving the use of a free-radical tend to incorporate an oligomer of the functional group monomer unit. Moreover, the so-called ENE reaction can be accomplished without any significant coupling while the free-radical methods generally result in significant coupling, particularly when the polymer contains significant amounts of ethylenic unsaturation when the reaction is accomplished. Carboxylation of a polymer containing ethylenic unsaturation or a polymer containing ethylenic unsaturation and aromatic unsaturation may also be accomplished by first metallating the polymer, then reacting the metallated sites with a carboxylating agent such as $CO_2$. When the metallated polymer contains both ethylenic and aromatic unsaturation, the functionality will, generally, be distributed in a manner proportionate to the relative number of ethylenically unsaturated sites and aromatic rings contained in the polymer. When a polymer is functionalized by metallating followed by reaction with a suitable electrophile, only one functional group can be incorporated at each site of incorporation and coupling generally is not significant. Functionalized polymers containing a significant amount of ethylenic unsaturation still exhibit poor weatherability and poor thermal stability.

It has also recently been discovered that both the weatherability and thermal stability of ethylenically unsaturated polymers can be improved by hydrogenation of at least a portion of the ethylenic unsaturation. Hydrogenation of these type polymers also makes them useful as oil additives, particularly as viscosity improvers. Methods for hydrogenating ethylenically unsaturated polymers are, of course, well known in the prior art. For example, methods for nonselectively hydrogenating polymers containing both ethylenic and aromatic unsaturation are taught in U.S. Pat. Nos. 3,113,986; 3,595,942 and 3,700,633 while processes for selectively hydrogenating ethylenic unsaturation in polymers containing both ethylenic and aromatic unsaturation are taught in U.S. Pat. Nos. 3,634,549; 3,670,054; 3,700,633 and U.S. Pat. No. Re. 27,145. These methods may, of course, be used to hydrogenate polymers containing only ethylenic unsaturation. These processes cannot, however, be used to hydrogenate polymers containing certain acidic functional groups which would interfere with the hydrogenation reaction such as carboxyl groups and the like. The reason or reasons for the inoperability of these several processes with such functionalized polymers is, of course, not well known, but it is believed due to a chemical reaction between the metal or metal compounds contained in or used to prepare the catalyst and the functional groups, which reaction effectively deactivates the catalyst. Also, when the catalyst is prepared with a metal compound containing a cation capable of complexing with the functional group, gelling of the polymer solution is frequently encountered.

Processes for hydrogenating polymers containing ethylenic unsaturation and carboxyl functionality are, of course, also known in the prior art. For example, it is known to use supported and unsupported metals such as palladium as catalysts as taught, for example, in U.S. Pat. Nos. 3,793,274; 4,460,724; 4,129,557; and 4,010,130; and U. K. Patent. No. 1,356,309. It is also known to use catalysts such as thorium complexes as taught, for example, in U.S. Pat. Nos. 4,631,315 and rhodium complexes as taught, for example, in U.S. Pat. Nos. 3,700,637 and 4,647,627 and U. K. Patent No. 1,558,491. These catalysts are not, however, generally, practical for large scale commercial operations where catalyst recovery is inefficient as in polymer hydrogenation processes. In this regard, it should be noted that these precious metals are available in limited supply which makes them very costly when compared to metals commonly used in polymer hydrogenation processes.

Since there are several well known advantages associated with both an acidic functionalized, particularly a carboxylated, and hydrogenated polymer, it has, heretofore, been expedient to first hydrogenate the ethylenically unsaturated polymer and then functionalize the same. Once the ethylenically unsaturated polymer has been hydrogenated, however, the methods which can be used for functionalization are reduced. It will, of course, be appreciated that to the extent that the hydrogenated polymer contains a significant amount of residual ethylenic unsaturation, any of the techniques heretofore noted could be used. If the hydrogenation of the ethylenic unsaturation has, however, been completed or substantially completed, incorporation of functionality via the so-called ENE reaction as well as by free-radical addition of an ethylenically unsaturated functionalizing agent across an ethylenically unsaturated site is no longer possible. Functionalization may, of course, be accomplished in selectively hydrogenated copolymers containing aromatic unsaturation using the method described in U.S. Pat. No. 4,145,298 but metallization of such a polymer followed by reaction with a functionalizing agent will incorporate the functionality exclusively into the aromatic portion of the polymer. This method is, of course, frequently used today and polymeric compositions containing such functionalized polymers do offer several advantages. More recently, however, the desirability of having at least some acidic functionality in the elastic portion of the polymer has been discovered. Functionalization may also be accomplished by the method described in U.S. Pat. No. 4,578,429, a method believed to impart functionality into the elastomeric portion of such hydrogenated polymers by free-radical grafting of an ethylenically unsaturated compound onto the polymer. Such free-radical grafting, however, results in degradation of the polymer. When the polymer is a block copolymer containing, for example, terminal polymeric blocks comprising monoalkenyl aromatic hydrocarbon monomer units and a central polymeric block containing conjugated diolefin monomer units, which block would be elastic, cleavage of the block copolymer within the elastomeric (central) block can destroy or at least reduce the advantages otherwise associated with the use of such a polymer. Also, when the method of U.S. Pat. No. 4,578,429 is used to incorporate the desired functionality, the functionality is believed to be concentrated at a limited number of sites as oligomers of the monomer unit used as a source of the functional group rather than distributed somewhat uniformly along the polymer chain. Moreover, the amount of functionality incorporated into the polymer with this particular method is difficult to control and the length of the oligomer is generally longer than that which would be incorporated into an unsaturated polymer due to the reduced number of sites available for reaction. In light of this, the need for an improved process for preparing hydrogenated polymers containing acidic functional groups that interfere with the more commonly used hydrogenation catalyst, particularly a process wherein at least some such functionality can be incorporated into an elastomeric portion of the polymer without degrading the same, and for the products thereof is believed to be readily apparent.

SUMMARY OF THE INVENTION

It has now been discovered that the foregoing and other disadvantages of the prior art processes for preparing hydrogenated and acidic functionalized polymers can be avoided, or at least significantly reduced, with the process of this invention. It is, therefore, an object of this invention to provide a process for preparing a hydrogenated polymer containing acidic functional groups which would interfere with the hydrogenation if such functional groups were present during such hydrogenation. It is another object of this invention to provide such a process which will yield hydrogenated polymers containing at least some functionality reasonably uniformly distributed in that portion of the polymer initially containing the ethylenic unsaturation. It is yet another object of this invention to provide hydrogenated polymers containing some functionality reasonably uniformly distributed in that portion of the polymer initially containing the ethylenic unsaturation. The foregoing and other objects and advantages will become apparent from the description of the invention set forth hereinafter and from the examples contained therein.

In accordance with the present invention, the foregoing and other objects and advantages are accomplished by first incorporating a precursor of the desired acidic functional group into the polymer, thereafter hydrogenating the polymer so as to convert (saturate) at least a portion of the ethylenic unsaturation remaining therein and then converting at least a portion of the precursors contained in the polymer to the desired acidic functional group. Any of the methods known for incorporating an acidic functional group precursor into an ethylenically unsaturated polymer may be used to incorporate the precursor into the ethylenically unsaturated polymer in the first step of the process of this invention. Such methods include incorporation of the desired acidic functional group into the polymer and thereafter converting the functional group to a precursor radical, which radical will at least not interfere with the hydrogenation reaction to the same extent as the desired acidic functional group, and which radical can then be converted back to the desired acidic functional group after the hydrogenation is completed, and incorporation of a suitable precursor directly into the polymer. As indicated more fully hereinafter, the precursor radical obtained by converting a functional group may, but need not, be the same as the precursor incorporated directly into the polymer. For convenience, the precursor radicals to which an acidic functional group may be converted so as to permit hydrogenation as well as precursor radicals which may be incorporated directly will, frequently, both be referred to herein as a functional group precursor or an acidic functional group precursor. After the functional group precursor has been incorporated into the polymer, any of the methods known in the prior art for effecting hydrogenation of an ethylenically unsaturated polymer may be used to effect the desired degree of hydrogenation in the method of the instant invention.

DETAILED DESCRIPTION OF THE INVENTION

As indicated supra, the present invention relates to a process for preparing hydrogenated polymers which contain acidic functional groups which would interfere with the hydrogenation reaction if present in the polymer during hydrogenation with certain catalysts and to the polymeric products of such a process. When the polymer initially contains only ethylenic unsaturation, the functionality will be distributed within that portion of the polymer containing such unsaturation. When the polymer contains both ethylenic and aromatic unsaturation, the functionality may be contained exclusively in that portion of the polymer containing the ethylenic unsaturation before hydrogenation or may be distributed throughout the polymer; i.e., partly in that portion of the polymer containing the ethylenic unsaturation before the hydrogenation and partly in that portion of the polymer containing aromatic unsaturation. As also indicated supra, the process consists of first incorporating functional group precursors, which precursors have less of an adverse affect on hydrogenation than the corresponding acidic functional group, into a polymer containing ethylenic unsaturation or both aromatic and ethylenic unsaturation, thereafter hydrogenating at least a portion of the ethylenic unsaturation remaining in the polymer and then converting at least a portion of the functional group precursors to the desired acidic functional group. As further indicated supra, any of the methods known in the prior art for incorporating functional group precursors into ethylenically unsaturated polymers may be used to incorporate the functional group precursors into the polymer in the first step of the process of this invention. Similarly, hydrogenation of the polymer may be accomplished with any of those hydrogenation processes known in the prior art although the method of this invention is most advantageously used when the desired acidic functional groups would interfere with the hydrogenation such as when a catalyst prepared by combining a metal alkyl or hydride with a compound containing an iron group metal; viz., iron, cobalt or nickel, is used.

In general, any polymer containing ethylenic unsaturation or both aromatic and ethylenic unsaturation may be functionalized and hydrogenated using the method of this invention. In general, hydrogenation of either of these polymers may be partial or substantially complete. Polymers containing both aromatic and ethylenic unsaturation may also, of course, be selectively hydrogenated so as to convert (saturate) a significant portion of the ethylenic unsaturation while converting little or no aromatic unsaturation. As is well known, polymers containing both aromatic and ethylenic unsaturation can be prepared by copolymerizing one or more polyolefins, particularly a diolefin, with one or more alkenyl aromatic hydrocarbon monomers. The copolymers may, of course, be random, tapered, block or a combination of these. When the double bonds in the polyolefin are separated by three or more carbon atoms, the ethylenic unsaturation incorporated into the polymer will be contained in a branch extending outwardly from the main polymer chain but when the polyolefin is conjugated at least a portion of the ethylenic unsaturation incorporated into the polymer may be contained in the polymer backbone.

As is well known, polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers and these commercially available polymers can be functionalized and hydrogenated with the method of this invention.

While any of the polymers containing only ethylenic unsaturation or both aromatic and ethylenic unsaturation known in the prior art may be processed in accordance with the present invention, the use of a polymer prepared in solution is particularly expedient since functionalization and hydrogenation could be accomplished immediately after preparation of the polymer while the polymer remains in solution. As is well known, polymers of conjugated diolefins and copolymers of one or more conjugated diolefins and one or more alkenyl aromatic hydrocarbon monomers are frequently prepared in solution using anionic polymerization techniques. The present invention will, then, be described by reference to such polymers. It will, however, be appreciated that any polymer containing only ethylenic unsaturation or both aromatic and ethylenic unsaturation could be modified by incorporating desired functional groups or a precursor radical thereof and then processed in accordance with the method of this invention.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein:

R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene phenylbutadiene 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, vinyl naphthalene, alkyl-substituted vinyl naphthalenes and the like. In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like: haloqenated hydrocarbons, particularly halogenated aromatic hydrocarbons, such as chlorobenzene, chlorotoluene and the like; linear and cyclic ethers such as methyl ether, methyl ethyl ether, tetrahydrofuran and the like; ketones such as methyl ketone (acetone), methyl ethyl ketone, ethyl ketone (3-pentanone) and the like.

Conjugated diolefin polymers and conjugated diolefin-alkenyl aromatic copolymers which may be hydrogenated and functionalized in the present invention include those copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin-alkenyl aromatic hydrocarbon copolymers which may be functionalized and hydrogenated in accordance with this invention also include block copolymers such as those described in U.S. Pat. Nos. 3,231,635; 3,265,765 and 3,322,856, the disclosure of which patents are also incorporated herein by reference. In general, linear and branched block copolymers which may be functionalized and hydrogenated in accordance with the present invention include those which may be represented by the general formula:

$$A_z-(B-A)_y-B_x$$

Wherein:
A is a linear or branched polymeric block comprising predominantly monoalkenyl aromatic hydrocarbon monomer units;
B is a linear or branched polymeric block containing predominantly conjugated diolefin monomer units;
x and z are, independently, a number equal to 0 or 1;

Y is a whole number ranging from 0 to about 15, and the sum of $x+z+y \geq 2$.

Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference. Coupled and radial block copolymers which may be treated in accordance with the present invention include those which may be represented by the general formula:

$$[B_x-(A-B)_y-A_z]_n-C-P_{n'}$$

Wherein:
A, B, x, y and z are as previously defined;
n and n' are, independently, numbers from 1 to about 100 such that $n+n' \geq 3$;

C is the core of the coupled or radial polymer formed with a polyfunctional coupling agent; and
Each P is the same or a different polymer block or polymer segment having the general formula:

$$B'_{x'}-(A'-B'')_{y'}-A''_{z'}$$

Wherein:
A'' is a polymer block containing predominantly monoalkenyl aromatic hydrocarbon monomer units;
B' is a polymer block containing predominantly conjugated diolefin monomer units;
A'-B'' is a polymer block containing monoalkenyl aromatic hydrocarbon monomer units (A') and conjugated diolefin monomer units (B''), the A'-B'' monomer units may be random, tapered or block and when A'-B'' is block, the A' block may be the same or different from A'' and B'' may be the same or different from B';
x' and z' are, independently, numbers equal to 0 or 1; and
Y' is a number from 0 to about 15, with the proviso that the sum of $x'+y'+z \geq 1$.

The radial polymers may, then, be symmetric or asymmetric.

In general, the initial incorporation of a functional group which will be converted to a suitable functional group precursor or the direct incorporation of a suitable precursor radical may be accomplished when the polymer is in solution or in the molten state depending partly upon the method actually used to incorporate the functional group or functional group precursor and partly upon preference. In this regard, it should be noted that when the functional group to be converted to a suitable precursor radical or the functional group precursor radical is to be incorporated directly into the polymer is incorporated via to the so-called ENE reaction or via free-radical addition across a carbon-carbon double bond, either method (solution or molten state) is satisfactory. When the polymer is in the molten state, however, means capable of imparting high mechanical shear, such as an extruder, will, generally, be used to effect the desired reaction to incorporate the functional group to be converted or to directly incorporate a suitable precursor radical. When the functional group to be converted to a suitable precursor or the precursor radical incorporated directly is incorporated via techniques such as metallation followed by reaction with a suitable electrophile, on the other hand, incorporation will, preferably, be accomplished with the polymer in solution. Of the several methods available for incorporation of a functional group or functional group precursor, those methods tending to incorporate a single function group or functional group precursor unit at each site of incorporation with minimal coupling of the polymer such as the method using the so-called ENE reaction and the method involving metallation followed by reaction with an electrophile are preferred. When a functional group to be converted to a suitable precursor is incorporated into the polymer, conversion of the functional group to the precursor radical will also, generally, be accomplished with the polymer in solution. In general, any of the solvents known to be useful for preparing such polymers in solution may be used to effect these reactions or conversions.

Similarly, hydrogenation of the ethylenically unsaturated polymers in accordance with the present invention will be accomplished with the polymer in solution. In general, any of the solvents useful in preparing the polymer may be used to effect the hydrogenation. In general, the solution of polymer and solvent, when a solution is used in any step of the process of this invention, will contain from about 1 wt % to about 30 wt % polymer and from about 99 wt % to about 70 wt % solvent when the conversion and hydrogenation are completed.

In general, the method of this invention may be used to produce hydrogenated polymers containing any acidic functional group which would, if dissolved in water, yield a hydrogen ion concentration within the range from about $1 \times 10^{-1}$ to about $1 \times 10^{-5}$ (a pH of about 1 to about 5). The method of this invention could, of course, also be used to incorporate functional groups which are acids capable of yielding solutions having higher pH's but use of the process of this invention with such functional groups would not be necessary since these higher pH functional groups would not, generally, interfere with direct hydrogenation of the polymer with the hydrogenation catalysts useful in the method of this invention. The method of this invention is, then, particularly useful for the production of polymers containing organic acid functionality such as carboxyl functionality, aromatic hydroxyl functionality and the like and inorganic acid functionality such as sulfonic acid functionality, phosphoric acid functionality and the like. Incorporation of these functionalities into a polymer containing ethylenic unsaturation is, of course, well within the ordinary skill of the art and a detailed discussion of methods useful for such incorporation will not be included herein. Nonetheless, the principle methods commonly used for such incorporation will be briefly summarized hereinafter.

When the polymer is to be carboxylated and the carboxyl groups then converted to a suitable carboxyl group precursor radical, the polymer may be carboxylated using any of the methods known in the prior art to be effective for carboxylating such polymers. For example, an unsaturated monofunctional or polyfunctional carboxylic acid or anhydride such as acrylic acid or anhydride or maleic acid or maleic anhydride can be grafted onto the polymer chain at carbon atoms allylic to ethylenic unsaturation using the so-called ENE reaction as taught in U.S. Pat. Nos. 4,292,414; 4,308,353 and 4,427,828, the disclosure of which patents are herein incorporated by reference. As is well known, the so-called ENE reaction may be accomplished with the polymer in solution or in the molten state. The ENE reaction will, generally, be accomplished at a temperature within the range from about 100° C. to about 400° C. in the absence of free-radicals or free-radical initiators. When this technique is used with polymers containing both ethylenic and aromatic unsaturation the incorporated carboxyl groups will be contained exclusively in that portion of the polymer containing the ethylenic unsaturation. Carboxyl functionality may also be incorporated into the polymer by free-radical addition of an unsaturated carboxylic acid or anhydride across an ethylenic double bond contained in the polymer. Free-radical grafting may be accomplished thermally, generally at temperatures within the range from about 150° C. to about 300° C., or in the presence of a free-radical initiator, generally at temperatures within the range from about 50° C. to about 300° C. As is also well known, this grafting reaction may be accomplished with the polymer in solution or in the molten state. When this technique is used, the carboxyl groups will again be contained exclusively in that portion of the polymer containing the ethylenic unsaturation. In general, any of the ethylenically unsaturated carboxylic acids and/or anhydrides known in the prior art to be subject to the ENE reaction or graftable onto ethylenically unsaturated polymers may be used to incorporate the carboxyl functionality into the polymers which may be hydrogenated with the method of the present invention. The carboxylic acid and/or anhydride may be monofunctional such as acrylic, methacrylic, cinnamic, crotonic, isocrotonic and the like or polyfunctionals such as maleic, fumeric, itaconic, citraconic, mesaconic and the like. Carboxyl functionality may further be incorporated onto the ethylenically unsaturated polymer by first metallating the polymer, reacting the metallated polymer with a carboxylating agent such as $CO_2$ and thereafter contacting the reaction product with a proton donor as taught in U.S. Pat. No. 3,976,628, the disclosure of which patent is herein incorporated by reference. As is well known, carboxylation of the polymer via metallization of the polymer will, generally, be accomplished with the polymer in solution. As is known in the prior art, this method produces an intermediate product wherein at least a portion of the carboxyl functionality is present as a carboxyl group precursor. This intermediate product could, then in certain cases at least, be hydrogenated before the carboxyl group precursor is converted to the carboxylic acid group. It may be, and generally will be, advantageous, however, to convert any acid groups formed in the intermediate product as a result of the reaction with $CO_2$ and contained in the intermediate product or at least a portion thereof to a salt group before effecting the hydrogenation. While any of the methods known in the prior art may be used to incorporate the functional group or the functional group precursor, it is again worth noting that those methods tending to incorporate a single unit at each site of incorporation with minimal coupling are preferred.

As indicated supra, it has now been discovered that certain acidic functional groups contained in a polymer also containing ethylenic unsaturation significantly inhibit hydrogenation of the ethylenic unsaturation at least when catalysts reactive with such groups are used. It is, then, necessary to convert the strongly acid functional group or groups to a different radical which will not interfere with the hydrogenation reaction, or at least which interferes less than the certain acidic functional groups, which radical can then be restored to the acidic functional group after hydrogenation is completed. While the acidic functional group might be converted to any number of groups which would interfere with the hydrogenation less than the acidic group itself, conversion to a relatively neutral group such as a metal salt, an ester, an amide and the like is most effective. Aromatic hydroxyl functionality may also be converted to a carbonate but cannot be converted to an amide. In general, and as indicated supra, conversion of acidic functional groups to acid functional group precursors will be accomplished with the polymer in solution.

In general, when an acid group is converted to a metal salt precursor radical, any metal cation could be used to form the salt so long as the metal cation actually used will not be displaced from the salt by one or more of the metals used to prepare the catalyst, particularly the metal in the reducing component, and so long as the metal or metal compound used as a source of the metal ion does not react or complex with the acid group so as to gel or otherwise crosslink or couple the polymer segments. Displacement will, of course, generally, be avoided when the salt is prepared with the same metal as is contained in the metal alkyl or hydride used to prepare the catalyst. Use of the same metal to prepare the salt as is contained in the reducing component used to prepare the catalyst is, therefore, preferred. Moreover, while, in general, any metal could be used it appears that any metal cation will, to some extent, inhibit or impair the hydrogenation reaction. While the reasons for this impairment are not completely clear and while the inventor does not wish to be bound by any particular theory, it is believed that the impairment is at least in some way associated with an interaction between the polymer bound functional group precursor, particularly the metal cation thereof, and one of the components, particularly the reducing component, used to prepare the catalyst or a product of any reaction occurring between these components. Such interaction is particularly apparent when the functional group precursor is capable of complexing with a metal used in the preparation of the hydrogenation catalyst. For example, a polymer containing ethylenic unsaturation and lithium carboxylate functional group precursor radicals would be expected to complex with either the aluminum reactant or a reaction product thereof when a catalyst prepared by combining a nickel carboxylate and an aluminum trialkyl is used to effect hydrogenation. The potential reaction with the Al trialkyl can be illustrated by the following equation:

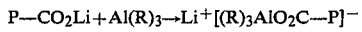

Wherein:
P is a polymer segment;
P—CO$_2$Li is the polymer segment P having a single, for illustrative purposes, functional group precursor attached thereto; and
R is an alkyl group.

Obviously, if the metal in the functional group precursor were the same as the metal in the reducing component used to prepare the catalyst, complexing would not occur. Complexing can also be avoided, or at least minimized, even when different metals are used, by selecting a combination of metals which are not prone to complexing. In general, and as is well known in the prior art, carboxyl groups may be converted to metal salts by reaction of the carboxyl group with an active metal (Groups I-A and II-A) in its elemental state or a basic compound of essentially any metal such as a metal hydroxide, a metal alkyl, a metal hydride and the like. The reference to Groups I-A and II-A relates to Groups I-A and II-A of the Periodic Table of the Elements. All such reference to these and other groups herein is by reference to the Periodic Table of the Elements as arranged by Mendeleev and published in Kirk-Othmer, Encyclopedia of Chemical Technology, Second Edition, 8:94. In general, such reaction may be accomplished at a temperature within the range from about 20° C. to about 60° C. at essentially any pressure. In general, the active metal, the basic metal compound and the like will be used at or near the stoichiometric amount required to convert all carboxyl groups so as to avoid the incorporation of a significant excess of reagent into the polymer solution. To the extent that an excess amount is added, however, it will, generally, be expedient to remove such excess prior to hydrogenation so as to avoid possible interference with the hydrogenation reaction.

In general, when a carboxyl group is converted to an ester as the functional group precursor, essentially any monoalcohol or monoepoxide could be reacted with the carboxyl group. To minimize possible steric hinderance, however, aliphatic alcohols containing from 1 to about 10 carbon atoms will, advantageously, be used. When the carboxyl group is converted to an amide as the functional group precursor, essentially any inorganic acid halide may be reacted with the carboxyl group and the resulting acyl halide then reacted with ammonia. Alternatively, the carboxyl group may be converted to a quaternary ammonium salt, by reaction with ammonia or a primary or secondary amine, and the quaternary ammonium salt then converted to the amide by heating. In each of these conversions, care will, generally, be exercised so as to avoid the use of excess reagent and, when the reagent would interfere with a subsequent hydrogenation, any excess reagent will be removed. These conversions will be accomplished at conditions well known in the prior art. Again, these conversions will, generally, be accomplished in a suitable solvent.

It will, of course, be appreciated that when the ethylenically unsaturated elastomer is first functionalized using the ENE reaction or free-radical grafting and the functional groups then converted to a functional group precursor, all or at least substantially all of the functional groups will be incorporated into that portion of the polymer containing the ethylenic unsaturation. As indicated supra, there are end use applications for carboxylated polymers wherein such distribution of the carboxyl groups appear to be advantageous. There may, however, be other end use applications wherein it would be advantageous to have carboxyl groups distributed in both an elastomeric portion of a polymer such as a block copolymer containing ethylenic unsaturation and a plastic portion containing aromatic unsaturation. Such distribution may, then, be accomplished by first metallating the polymer, reacting the metallated polymer with a carboxylating agent such as CO$_2$ and then reacting the carboxylated polymer with a proton donor as taught in U.S. Pat. No. 3,976,628. When the polymer thus treated contains both aromatic and ethylenic unsaturation, the carboxyl groups will be distributed in both sections proportionately to the relative amount of aromatic rings and ethylenic unsaturation contained in the polymer. As suggested supra, the product obtained by reacting the metallated polymer with the carboxylating agent will be a polymer containing at least a portion of the carboxyl functionality as a carboxylic acid metal salt group, the remainder being as the acid group, and in some cases at least may be directly hydrogenated depending largely upon the number of acid groups contained therein. These salt precursor groups, like the carboxyl groups, will be proportionately distributed in the aromatic and elastomeric portions of the polymer.

Aromatic hydroxyl functionality may be incorporated into a polymer containing both aromatic and ethylenic unsaturation by preparing the polymer with a compound containing an aromatic hydroxyl group such as a hydroxy-substituted styrene and the like or by grafting such compounds onto the polymer. Inorganic acid functionality can be incorporated into a polymer containing ethylenic unsaturation or both aromatic and ethylenic unsaturation by preparing the polymer with a compound containing an inorganic acid group such as styrene sulfonate or by grafting such a compound onto the polymer and by direct sulfonation of the polymer with acyl sulfates. As is well known, the reactions may be accomplished at temperatures within the range from about 50° C. to about 200° C. In general, direct sulfonation occurs stoichiometrically. As a result, the polymer will, generally, be contacted with a stoichiometric amount of the reagent required to impart the desired amount of functionality or an amount just slightly in excess of the stoichiometric amount. In general, the functional groups imparted via direct sulfonation will be incorporated into that portion of the polymer containing the ethylenic unsaturation. Each of these functional groups can be converted to a satisfactory precursor group using known technology. For example, the aromatic hydroxyl functional group can be converted to an ester group by reaction with a carboxylic acid or a carboxylic acid halide or to a carbonate by reaction with phosgene or an alkyl carbonate such as methyl carbonate. The inorganic acid functional groups may be converted to salt groups by reaction with a metal hydroxide or esterified by reaction with alcohols or suitable alkyl halides.

After the functional group precursors have been incorporated into a polymer containing ethylenic unsaturation or both aromatic and ethylenic unsaturation, the polymer will next be hydrogenated so as to convert (saturate) at least a portion of the ethylenic unsaturation in the polymer. As indicated supra, the maximum amount of ethylenic unsaturation that may be converted (saturated) will vary with the particular carboxylic acid precursor radical actually used as well as the catalyst actually selected, and particularly the nature of the metal atom contained in the reducing component used to prepare the catalyst. In any case, however, it will be possible to convert (saturate) at least about 50% of the ethylenic unsaturation initially contained in the polymer and catalyst components and acidic functional group precursors can be selected which will permit conversion (saturation) of up to at least about 90% to about 95% of the ethylenic unsaturation initially contained in the polymer.

To the extent that it is desirable to convert at least a portion of the aromatic unsaturation contained in a polymer containing both aromatic and ethylenic unsaturation, the amount of aromatic unsaturation that may be converted will depend, firstly, on whether the aromatic unsaturation contains a functional group precursor radical and, if it does, secondly, on the particular functional group precursor radical employed and the particular catalyst used to effect the hydrogenation. It will, of course, be appreciated that if the aromatic portion of the polymer does not contain an acidic precursor radical, hydrogenation of the aromatic unsaturation will not be affected and whether hydrogenation of the aromatic unsaturation is effected will be controlled by methods well known in the prior art. In this regard, the relative selectivity of various catalysts used for hydrogenating polymers containing both aromatic and ethylenic unsaturation are well known. The amount of aromatic unsaturation actually converted will, then, depend primarily upon the particular catalyst selected, the concentration thereof used during hydrogenation and the hydrogenation conditions actually used. When the aromatic unsaturation does, however, contain one or more functional group precursor radicals, the extent of hydrogenation will depend upon the particular functional group precursor radical present and the particular catalyst employed. In general, the amount of aromatic unsaturation actually converted when the aromatic portion of the polymer also contains one or more functional group precursor radicals will, generally, be less than the amount of ethylenic unsaturation converted primarily because the ethylenic unsaturation is generally more easily hydrogenated than the aromatic unsaturation.

In general, the hydrogenation or selective hydrogenation of the polymer may be accomplished using any of the several hydrogenation processes known in the prior art. For example the hydrogenation may be accomplished using methods such as those taught, for example, in U.S. Pat. Nos. 3,494,942; 3,634,594; 3,670,054; 3,700,633 and U.S. Pat. No. Re. 27,145, the disclosure of which patents are incorporated herein by reference. In general, the methods known in the prior art and useful in the present invention for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising an iron group metal atom. In the methods described in the foregoing patents, a catalyst is prepared by combining an iron group metal, particularly nickel or cobalt, compound with a suitable reducing agent such as an aluminum alkyl. The preferred iron group metal compounds are carboxylates and alkoxides. Various chelates and salts of sulfur-containing hydrocarbyl acids and partial ester thereof such as taught in U. K. Patent No. 1,030,306, the disclosure of which patent is herein incorporated by reference, are also useful in the process of this invention. Also, while aluminum alkyls are the preferred reducing agents, it is known in the prior art that alkyls and hydrides of metals of Groups I-A, II-A and III-B of the Periodic Table of the Elements are effective reducing agents, particularly lithium, magnesium and aluminum. In general, the iron group metal compound will be combined with Group I-A, II-A or III-B metal alkyl or hydride at a concentration sufficient to provide Group I-A, II-A and/or III-B metal to iron group metal atomic ratio within the range from about 0.1:1 to about 20:1, preferably from about 1:1 to about 10:1. As indicated in the foregoing patents, the hydrogenation catalyst is generally prepared by combining the iron group metal compound and the reducing agent in a suitable solvent or diluent at a temperature within the range from about 20° C. to about 60° C. before the catalyst is fed to the hydrogenation reactor. Satisfactory results can, however, frequently be obtained by feeding the catalyst components separately into the reactor. In practicing the method of the present invention, water may, and preferably will be, present when the components used to prepare the catalyst are combined. When water is present, water will be present at a concentration within the range from about 0.3 to about 1.3 moles of water per mole of iron group metal compound. The water may, then, be conveniently combined with the iron group metal compound before it is combined with the metal alkyl or hydride used to prepare the catalyst.

In general, the hydrogenation will be accomplished in a suitable solvent at a temperature within the range from about 20° C. to about 80° C. and at a hydrogen partial pressure within the range from about 100 psig to about 5,000 psig, preferably about 100 psig to 1,000 psig. Catalyst concentrations within the range from about 50 ppm (wt) to about 500 ppm (wt) of iron group metal based on total solution are generally used and contacting at hydrogenation conditions is generally continued for a period of time within the range from about 60 to about 240 minutes. After the hydrogenation is completed, the hydrogenation catalyst and catalyst residue will, generally, be separated from the polymer. Separation of the catalyst and catalyst residue may be accomplished using methods well known in the prior art; however, separation by washing with an aqueous acid solution is preferred. Essentially any acid, organic and inorganic, may be used to effect separation of the catalyst and catalyst residue. Interestingly, when an aqueous acid solution is used to separate the catalyst from a polymer containing a metal salt as the functional group precursor radicals, the metal salt will be simultaneously converted to the corresponding carboxylic acid radical.

After the hydrogenation has been completed and when the functional group precursor radicals were not converted to the desired functional group during the catalyst separation step, the hydrogenated polymer containing the functional group precursor radicals may then be treated to either form or restore the desired functional group. As indicated supra, conventional technology may be used to effect conversion of the functional group precursor radical to the functional group. For example, and as indicated supra, when the functional group precursor is a metal salt, the salt may be converted to the acid by contacting the polymer, and hence, the salt group with a proton donor such as an organic or inorganic acid. Generally, acids such as acetic acid, citric acid, dilute sulfuric acid and dilute hydrochloric acid are particularly effective. This conversion is readily accomplished at ambient conditions. When the functional group precursor radical is an ester, an amide, a carbonate or the like, on the other hand, the conversion will be accomplished via hydrolysis. Generally, the hydrolysis may be accomplished in the presence of either an acidic or basic catalyst. When a basic catalyst is used, however, it will, frequently, be necessary to contact the resulting product with a proton donor so as to convert the metal salt formed by reaction of the basic catalyst with the acidic functional group. In general, the conversion of an ester, an amide, carbonate or the like functional group precursor radical to the desired functional group via hydrolysis will be accomplished at a temperature within the range from about 100° C. to about 350° C. in an inert atmosphere.

After conversion of the functional group precursor radical to the corresponding functional group has been completed, the selectively hydrogenated polymer containing acidic functionality may be recovered from solution as a crumb using techniques well known in the prior art. For example, the dissolved polymer may be precipitated by adding a suitable non-solvent to the solution. Suitable non-solvents include alcohols, ketones, and the like. Preferably, however, the polymer will be recovered by contacting the solution with steam or water and the solvent then separated via distillation. After the polymer has been recovered as a crumb, the same may be treated to separate any entrained impurities introduced as a result of the hydrogenation and functionalization unless these impurities have been previously separated.

The selectively hydrogenated, acid functionalized polymer of this invention may be used in any of the end use applications known in the prior art for such polymers. Suitable end uses, then, include use as an impact modifier, as a viscosity index improver, as a precursor to modified viscosity index improvers such as dispersant-viscosity index improvers, as a tie layer or as a tie layer component, as a component in adhesive compositions and the like.

PREFERRED EMBODIMENT

In a preferred embodiment of the present invention, a block copolymer comprising at least one block containing monoalkenyl aromatic hydrocarbon monomer units and at least one block comprising conjugated diolefin monomer units will be modified by incorporating a functional group or a functional group precursor using a technique designed to incorporate a single group or group precursor unit at each of the sites of incorporation; more preferably, the polymer will be metallated using a lithium alkyl; the active metal sites incorporated into the polymer will then be converted to carboxyl functional groups by reaction with $CO_2$ to impart the carboxyl functionality and the polymer then contacted with LiOH to convert at least a portion of the carboxyl groups contained in the polymer to the salt and the polymer thereafter selectively hydrogenated so as to convert (saturate) at least about 80%, more preferably at least 90%, of the ethylenic unsaturation initially contained in the polymer without converting a significant portion, less than about 25%, more preferably less than about 5%, of the aromatic unsaturation contained in the polymer and at least a portion of the metal salt groups then converted to the corresponding carboxylic acid group. In the preferred embodiment, the monoalkenyl aromatic hydrocarbon polymer blocks will have a weight-average molecular weight within the range from about 1,000 to about 125,000 and the conjugated diolefin polymer blocks will have a weight-average molecular weight within the range from about 10,000 to about 450,000. Most preferably, the ethylenically unsaturated polymer will contain a single polystyrene block and a single polybutadiene block. In the preferred embodiment, the polymer will be metallated so as to incorporate a sufficient number of metal sites to permit the production of a polymer containing, on average, from about 1 to about 50 carboxylic acid groups per polymer chain. In the preferred embodiment, the hydrogenation catalyst will be prepared by combining an iron group metal carboxylate containing a metal selected from the group consisting of nickel and cobalt and from about 5 to about 30 carbon atoms with a metal alkyl containing a metal selected from Group I-A of the Periodic Table of the Elements, most preferably lithium. In the preferred embodiment, the iron group metal carboxylate will be combined with from about 0.5 moles to about 0.75 moles of water per mole of carboxylate. In the preferred embodiment, the iron group metal compound will be combined with the Group I-A metal alkyl during preparation of the catalyst at a concentration sufficient to provide a Group I-A metal atom to iron group metal atom ratio with the range from about 1:1 to about 10:1. In the preferred embodiment, the catalyst will be prepared in cyclohexane and the hydrogenation will be completed in a mixed tetrahydrofuran/cyclohexane solvent. The hydrogenation will be completed at a temperature within the range from about 40° C. to about 80° C. at a hydrogen partial pressure within the range from about 100 psig to about 1,000 psig, most preferably at a hydrogenation partial pressure within the range from about 500 psig to about 700 psig. During the hydrogenation, from about 50 ppm (wt) to about 200 ppm (wt) iron group metal, based on total solution, will be present. The polymer will be contained in the solution at a concentration within the range from about 1 wt % to about 30 wt %, based on combined polymer and solvent. In a most preferred embodiment, the catalyst will be prepared by combining a nickel 2-ethylhexanoate with a lithium alkyl wherein the alkyl group contains from about 1 to about 5 carbon atoms. The preferred polymer will have a single functional group unit at each site of functionalization and the functional groups will be randomly distributed in those portions (blocks) of the polymer containing the groups.

Having thus broadly described the present invention and a preferred and most preferred embodiment thereof, it is believed that the same will become even more apparent by reference to the following examples. It will be appreciated, however, that the examples are presented solely for purposes of illustration and should not be construed as limiting the invention unless limitations illustrated therein are incorporated into the claims appended hereto.

EXAMPLE 1

In this example, a catalyst prepared by combining nickel 2-ethylhexanoate containing 0.5 moles of $H_2O$ per mole of nickel carboxylate and s-butyl lithium was used to hydrogenate two different styrene-butadiene block copolymers. Both of the block copolymers contained carboxylic acid functionality, said functionality being present as a mixture of acid and salt groups, with one of the two polymers containing significantly less acid sites than the other. Both of the polymers tested were prepared by metallating a styrene-butadiene diblock copolymer and then reacting the metallated polymer with $CO_2$. The first polymer tested was, in effect, the reaction product obtained by reacting $CO_2$ with the metallated polymer while the second polymer tested was the product obtained by contacting this reaction product with sufficient LiOH to convert a substantial portion of the carboxyl groups to the Li salt. The first of the polymers tested, then, contained the carboxyl functionality primarily as an acid group while the second polymer had a reduced amount of the carboxyl functionality present as the acid. The starting block polymer for both of these products contained polystyrene blocks having a number-average molecular weight of 12,400 and polybutadiene blocks having a weight-average molecular weight of 66,200. The starting polymer; i.e., the polymer prior to metallization and carboxylation, had, on average, 973 ethylenic unsaturations per polymer chain. The metallization was accomplished by contacting a solution of the polymer in cyclohexane with s-butyllithium in the presence of tetra methylethylene diamine, at a temperature of 60° C. for 10 minutes. Initially, 16.07 moles of s-butyllithium were added per mole of polymer. After the metallization was completed, a portion of the metallated polymer gel was combined with dry ice contained in tetrahydrofuran at room temperature. The contacting with $CO_2$ was continued for 45 minutes. After the $CO_2$ treatment was completed, the carboxylated polymer which polymer contained 0.38 wt % carboxyl functionality (as acid and salt) was recovered as a crumb by precipitation with steam/water. Analysis revealed that about 64% of the carboxyl functionality was present as the acid, while about 36% of the acid functionality was present as the lithium salt. About 33% (wt) of the polymer coupled during the reaction with $CO_2$ and dimers, trimers and tetramers were identified. 67% (wt) remained uncoupled. Analysis of the carboxylated polymer product using deuterium NMR techniques also indicated that 54 wt % of the carboxyl functionality was incorporated in the polybutadiene blocks of the polymer while 46% was incorporated into polystyrene blocks. A first portion of this carboxylated polymer was next dissolved in a blend containing 77 wt % cyclohexane and 23% tetrahydrofuran at a concentration of 4.6 wt %, based on total solution, and then contacted with hydrogen at a partial pressure of 740 psig and an initial temperature of 45° C. in the presence of a catalyst prepared by combining nickel 2-ethylhexanoate and s-butyllithium separately in cyclohexane at a maximum temperature of 47° C. As indicated supra, the nickel 2-ethylhexanoate contained 0.5 moles of water per mole of nickel 2-ethylhexanoate. During hydrogenation, the temperature rose to about 83° C. The amount of nickel 2-ethylhexanoate and s-butyllithium actually combined was controlled such that the mixture contained one atom of nickel per 6 atoms of lithium. The catalyst was added to the cyclohexane/tetrahydrofuran polymer solution in an amount sufficient to provide 70 parts, by weight, of nickel per million parts, by weight, of polymer solution. Contacting during the hydrogenation reaction was continued for 180 minutes. Following the hydrogenation, the hydrogenated product was contacted with acetic acid to convert at least a significant portion of the lithium salt to the corresponding carboxylic acid group. Analysis of the product indicated that 75% of the ethylenic unsaturation originally contained in the carboxylated polymer was converted or hydrogenated during the hydrogenation reaction. A second portion of the carboxylated polymer recovered as a crumb was dissolved in tetrahydrofuran and then contacted with an aqueous solution of LiOH so as to convert a significant portion of the carboxyl groups to the corresponding Li salt group. After this contacting was completed, analysis of the polymer indicated that about 6% of the carboxyl functionality was present as the acid while 94% was present as the lithium salt. A portion of this polymer was then hydrogenated at the same conditions and with a catalyst identical to that which was used in the previous run. After the hydrogenation was completed, analysis indicated that 87% of the ethylenic unsaturation originally contained in the polymer was converted or saturated. As will be apparent from these results, then, increasing the portion of carboxyl functionality present in the salt form increases the extent of hydrogenation in three hours.

EXAMPLE 2

In this example, a carboxylated polymer was prepared from a diblock copolymer identical to that used in Example 1 and the carboxylated polymer was prepared in the same manner as was used in Example 1 except that the amount of s-butyllithium used during the metallation step was increased sufficiently to produce a carboxylated polymer containing about 0.67 wt % combined carboxyl functionality. Analysis of the polymer obtained as a crumb indicated that about 50% of the carboxyl functionality was present as the acid with the remainder present as a Li salt. About 55% (wt) of the polymer coupled during the carboxylation step while 45% (wt) remained uncoupled. The carboxylated polymer was next reacted with lithium hydroxide in the same manner as summarized in Example 1 and then hydrogenated with a catalyst prepared by combining nickel 2-ethylhexanoate and triethyl aluminum. After the polymer was reacted with the LiOH, about 7% of the carboxyl functionality remained in the acid form with the remaining 93% present as a Li salt. The polymer containing principally lithium salt groups was hydrogenated at a hydrogen partial pressure of 750 psig at a temperature ranging from 42° C. to about 80° C. for 180 minutes in the presence of a catalyst prepared by combining nickel 2-ethylhexanoate and triethyl aluminum. The catalyst was prepared by combining the nickel 2-ethylhexanoate and the triethyl aluminum separately in cyclohexane at ambient temperature for 10–15 minutes. Again, the nickel 2-ethylhexanoate contained 0.5 moles of water per mole of nickel 2-ethylhexanoate. The amount of nickel 2-ethylhexanoate and triethyl aluminum combined was sufficient to provide a mixture containing one mole of nickel per 2.3 moles of aluminum. After the catalyst components were combined, a sufficient amount of the cyclohexane suspension was added to the polymer to provide 70 parts (wt) of nickel per million parts (wt) of polymer solution. After the hydrogenation was completed, the hydrogenated product was contacted with acetic acid to convert at least a significant portion of the salt groups to the carboxylic acid groups. Analysis of the hydrogenated product obtained in this Example indicated that 55% of the ethylenic unsaturation originally contained in the polymer was converted or saturated. Further analysis also indicated that the amount of combined carboxyl functionality (acid and salt) in the polymer after conversion of the lithium salt was identical to that contained in the original polymer (0.67 wt %).

COMPARATIVE EXAMPLE

In this example, a polymer identical to that reacted with lithium hydroxide in Example 2 and containing 0.67 wt % carboxyl functionality was hydrogenated at the same conditions and with a catalyst identical to that used in Example 2 except that the polymer was present at a concentration of 12 wt %, based on total solution, during hydrogenation. Following the hydrogenation, analysis indicated that 16% of the ethylenic unsaturation originally contained in the polymer was converted or hydrogenated.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of the present invention.

Having thus described and illustrated the invention. What is claimed is:

1. A method for producing a hydrogenated and acidic functionalized polymer from a polymer initially containing ethylenic unsaturation or both aromatic and ethylenic unsaturation comprising the steps of:
   (a) incorporating one or more acidic functional group precursor radicals into a polymer containing ethylenic unsaturation or both aromatic and ethylenic unsaturation;
   (b) hydrogenating the product from step (a) so as to convert at least a portion of the ethylenic unsaturation initially contained in said polymer;
   (c) converting at least a portion of the acidic functional group precursor radicals contained in the product from step (b) to the corresponding acidic group; and
   (d) recovering a product containing acidic functionality.

2. The method of claim 1 wherein the hydrogenation is accomplished in the presence of a catalyst prepared by combining a compound of a metal selected from the Group consisting of cobalt and nickel and an alkyl or hydride of a metal selected from Groups I-A, II-A and III-B of the Periodic Table of the Elements.

3. The method of claim 2 wherein said compound of a metal is combined with from about 0.3 to about 1.3 moles of water per mole of compound.

4. The method of claim 3 wherein said compound is selected from the Group consisting of alkoxides and carboxylates.

5. The method of claim 4 wherein said alkyl or hydride is an alkyl or a hydride of a Group I-A metal.

6. The method of claim 5 wherein said Group I-A metal is lithium.

7. The method of claim 4 wherein said alkyl or hydride is an alkyl or a hydride of a Group III-B metal.

8. The method of claim 7 wherein said Group III-B metal is aluminum.

9. The method of claim 1 wherein said functional group precursor radical is selected from the Group consisting of metal salt radicals, ester radicals, amide radicals, and carbonate radicals.

10. The method of claim 9 wherein said acidic functional group precursor radical is a metal salt radical.

11. The method of claim 10 wherein the metal in said metal salt is selected from Group I-A of the Periodic Table of the Elements.

12. The method of claim 11 wherein the metal in said metal salt is lithium.

13. The method of claim 1 wherein said polymer is a block copolymer comprising at least one polymeric block containing predominantly monoalkenyl aromatic hydrocarbon monomer units and at least one polymeric block containing primarily conjugated diolefin monomer units.

14. The method of claim 13 wherein said monoalkenyl aromatic hydrocarbon is styrene.

15. The method of claim 14 wherein said conjugated diolefin is butadiene.

16. The method of claim 1 wherein at least 80% of the ethylenic unsaturation initially contained in the polymer is converted (hydrogenated) during the hydrogenation step.

17. The method of claim 1 wherein at least a portion of said functional group precursor radicals are incorporated into that portion of said polymer initially containing ethylenic unsaturation.

18. A polymer comprising acidic functionality, at least a portion of said acidic functionality being in that portion of said polymer initially containing ethylenic unsaturation, prepared with a process comprising the steps of:
   (a) incorporating one or more acidic functional group precursor radicals into a polymer containing ethylenic unsaturation or both aromatic and ethylenic unsaturation, at least a portion of the acidic functional group precursor radicals being incorporated into that portion of said polymer containing said ethylenic unsaturation;

(b) hydrogenating the product from step (a) so as to convert at least a portion of the ethylenic unsaturation initially contained in said polymer;

(c) converting at least a portion of the acidic functional group precursor radicals contained in the product from step (B) to the corresponding acidic group; and (d) recovering a product containing acidic functionality.

19. The polymer of claim 18 wherein the hydrogenation is accomplished in the presence of a catalyst prepared by combining a compound of a metal selected from the Group consisting of cobalt and nickel and an alkyl or hydride of a metal selected from Groups I-A, II-A and III-B of the Periodic Table of the Elements.

20. The polymer of claim 19 wherein said compound of a metal is combined with from about 0.3 to about 1.3 moles of water per mole of compound.

21. The polymer of claim 20 wherein said compound is selected from the Group consisting of alkoxides and carboxylates.

22. The polymer of claim 21 wherein said alkyl or hydride is an alkyl or a hydride of a Group I-A metal.

23. The polymer of claim 22 wherein said Group I metal is lithium.

24. The polymer of claim 21 wherein said alkyl or hydride is an alkyl or a hydride of a Group III-A metal.

25. The polymer of claim 22 wherein said Group III-B metal is aluminum.

26. The polymer of claim 18 wherein said functional group precursor radial is selected from the Group consisting of metal salt radicals, ester radicals, amide radicals, and carbonate radicals.

27. The polymer of claim 26 wherein said acidic functional group precursor radical is a metal salt radical.

28. The polymer of claim 27 wherein the metal in said metal salt is selected from Group I-A of the Periodic Table of the Elements.

29. The polymer of claim 28 wherein the metal in said metal salt is lithium.

30. The polymer of claim 18 wherein said polymer is a block copolymer comprising at least one polymeric block containing predominantly monoalkenyl aromatic hydrocarbon monomer units and at least one polymeric block containing primarily conjugated diolefin monomer units.

31. The polymer of claim 30 wherein said monoalkenyl aromatic hydrocarbon is styrene.

32. The polymer of claim 31 wherein said conjugated diolefin is butadiene.

33. The polymer of claim 18 wherein at least 80% of the ethylenic unsaturation initially contained in the polymer is converted during the hydrogenation step.

* * * * *